March 12, 1957

E. SCHAEFER 2,784,996

SAFETY HANDLE FOR UTENSILS

Filed April 28, 1953

INVENTOR.
EUSTACE SCHAEFER
BY
*William J. Ruano*
ATTORNEY

United States Patent Office 2,784,996
Patented Mar. 12, 1957

2,784,996

SAFETY HANDLE FOR UTENSILS

Eustace Schaefer, Reading, Pa.

Application April 28, 1953, Serial No. 351,589

1 Claim. (Cl. 294—27)

This invention relates to a safety handle support for utensils such as pots and pans having permanent handles, and more particularly relates to a safety handle support which may be used to supplement the support provided by a loose pot handle and thus prevent the possibility of accidental tilting and spilling of the pot on account of its loose handle.

In the past, various types of handles have been provided for cooking utensils to enable grasping and lifting thereof, but an outstanding disadvantage of such handles has been their complicated construction and their cost which have prevented widespread commercial use of such handles.

An object of my invention is to provide a safety handle support in the form of a one piece, readily detachable or attachable handle for attachment to the rim of a cooking utensil and for cooperative engagement with the handle thereof in such a manner as to supplement the support provided by the utensil handle in such way as to prevent turning of the utensil about the axis of its handle as often occurs when the handle is loose.

A still further object of the present invention is to provide a supplemental handle for a cooking utensil for increasing the firmness of support between the handle and pot portions, which supplemental handle is of one piece, simple construction and very inexpensive to manufacture.

Other objects and advantages of the invention will become apparent from a study of the following description taken along with the accompanying drawing wherein.

Figure 1:
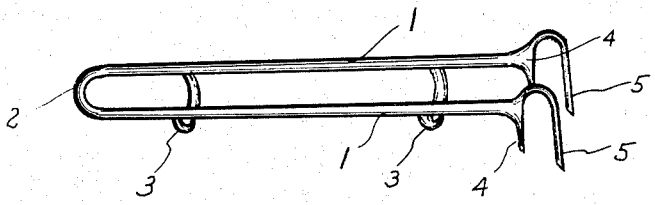
Figure 1 is a perspective view of a safety handle support embodying the principles of the present invention.

Referring more particularly to Figure 1 of the drawing, numeral 1 denotes two parallel portions of a safety handle support embodying the present invention which handle portions may be formed of a single length of wire bent at portion 2 into substantially U shape. Arcuate bridging elements 3 are welded, soldered or otherwise integrally secured at their ends to spaced portions of the handle portions 1 to form a cradle support for receiving the permanent handle of a cooking utensil. At the extremities of the U-shaped handle portion 1 there are provided integral projections 4 and 5 in the form of substantially U shaped hooks extending substantially at right angles to the portions 1 for receiving the top portion of the rim of the utensil as shown more clearly in Figures 2 and 3.

The safety handle support, shown in Figure 1, may be made of metal, such as wire, or if desired, may be made of other materials, such as reinforced plastic or other heat insulating materials.

The safety handle support shown in Figure 1 is useful for supplementing the permanent handle of any type or shape of cooking utensil, such as the pan 6 having a permanent handle 7. The safety handle support shown in Figure 1 is particularly useful in cases where the permanent handle such as 7, becomes loose from the pot portion 6, therefore providing the dangerous possibility of the pot accidentally turning about the axis of handle 7 as a pivot and therefore spilling the contents onto the floor or person.

Figure 2:
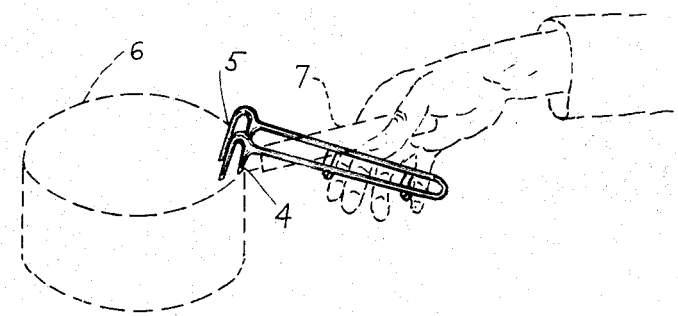
Figure 2 is a perspective view showing the first step in applying the safety handle support shown in Figure 1 to a cooking utensil.
Figure 3:
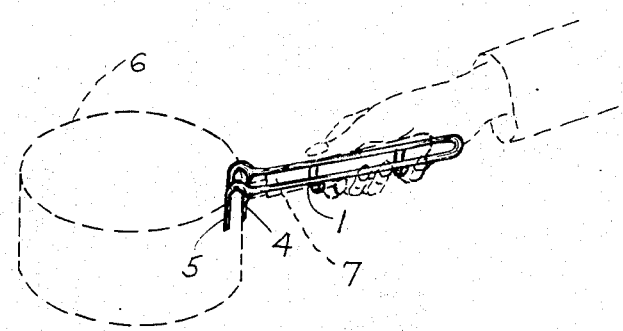
Figure 3 shows the final position of the safety handle support, wherein it receives the utensil handle in its cradle-like portion.

The safety handle support is applied to the cooking utensil in the manner shown in Figure 2, that is, by placing it underneath the handle 7 in a tilted position so as to enable the hook portions 4 and 5 to receive the top or brim portion of the pot adjacent the handle. The safety handle support is then tilted to the position shown in Figure 3, that is, in a position whereby it serves as a cradle or support for receiving therewithin the handle 7. Thus the housewife or other operator has a secure grasp of the cooking utensil so that even if the handle is loose, there is no possibility provided for accidental turning of the pot about the axis of handle 7 to cause the danger of spilling the contents. In short, the bridging elements 3 acts as a cradle support for handle 7 and the hooked portions 4 and 5 or jaws provide two additional points of support so as to absolutely prevent any possibility of accidental turning of the pot about its handle axis and spilling of the contents.

In cases where it is desired to keep the safety handle as a permanent part of the utensil handle, it would be merely necessary to provide rings or loops (not shown) which snugly surround both the handle and support for holding them tightly together.

Thus it will be seen that I have provided an efficient, safety handle support which provides an auxiliary support for a cooking utensil handle particularly one which has become loose, which safety handle support is of extremely simple, one piece construction, and which can be cheaply manufactured and sold at a low price; also I have provided an auxiliary handle support for cooking utensils, which support may be easily and quickly attached to or detached from a cooking utensil; furthermore I have provided an auxiliary detachable handle for cooking utensils which will greatly increase the steadiness of support of the cooking utensil and will prevent any possibility of relative movement between the pot portion and the handle which would otherwise cause accidental spilling of the contents.

While I have illustrated an described a certain specific embodiment of my invention, it will be understood that this is by way of illustration only, and that various changes and modifications may be made within the contemplation of my invention and within the scope of the following claim.

I claim:

A detachable auxiliary handle for a cooking utensil comprising a wire-like handle portion of elongated U shape bridged by a plurality of integral wire-like cross pieces of arcuate shape such as to provide a cradle for snugly receiving and partially enclosing the lower portion of an elongated regular handle of the cooking utensil, each of the extremities of said U shaped handle portion having integral hook portions of substantially U shape in the same plane with one of the legs of the handle portion extending substantially at right angles to said handle portion and having parallel legs, which hooks are adapted to fit over the top rim portion of the utensil adjacent the handle to form a one piece auxiliary handle, the legs at the extremity of the handle being longer than the innermost legs, whereby relative turning movement of the pot about its handle will be prevented by the steady and firm support provided by said auxiliary handle.

References Cited in the file of this patent

UNITED STATES PATENTS

| | | |
|---|---|---|
| 1,437,171 | Currey | Nov. 28, 1922 |
| 1,447,870 | Kusnitt | Mar. 6, 1923 |
| 1,469,868 | Zukoski | Oct. 9, 1923 |
| 1,773,628 | McGirk | Aug. 19, 1930 |
| 1,943,585 | Cummins et al. | Jan. 16, 1934 |
| 2,096,263 | Ruhlman | Oct. 19, 1937 |
| 2,457,898 | Hummel | Jan. 4, 1949 |
| 2,609,563 | Budelman | Sept. 9, 1952 |